United States Patent [19]

Habermann

[11] Patent Number: 4,639,150
[45] Date of Patent: Jan. 27, 1987

[54] INTERMEDIATE BEARING FOR THE PROPELLER SHAFT OF A MOTOR VEHICLE

[75] Inventor: Heinz P. Habermann, Bergisch Gladbach, Fed. Rep. of Germany

[73] Assignee: Ford Motor Company, Dearborn, Mich.

[21] Appl. No.: 843,891

[22] Filed: Mar. 25, 1986

[30] Foreign Application Priority Data

Mar. 29, 1985 [DE] Fed. Rep. of Germany ....... 3511480

[51] Int. Cl.$^4$ .................................. F16C 27/06
[52] U.S. Cl. .................................. 384/536; 384/582
[58] Field of Search .............. 384/536, 582, 535, 220, 384/215, 222

[56] References Cited

U.S. PATENT DOCUMENTS

| | | |
|---|---|---|
| 2,893,790 | 7/1959 | Raes et al. |
| 2,906,572 | 9/1959 | Wroby . |
| 2,927,825 | 3/1960 | Stone . |
| 2,963,106 | 12/1960 | Sampietro . |
| 3,306,679 | 2/1967 | Stokely . |
| 3,309,154 | 3/1967 | Stokely . |
| 3,325,230 | 6/1967 | Caunt . |
| 3,382,017 | 5/1968 | Cripe .................... 384/582 |
| 3,704,922 | 12/1972 | Kleinschmidt et al. ......... 384/582 |
| 3,743,365 | 7/1973 | Kato . |
| 3,961,829 | 6/1976 | Bowen et al. . |
| 4,542,996 | 9/1985 | Brissette et al. ............ 384/536 |
| 4,571,098 | 2/1986 | Rudnik .................... 384/536 |

FOREIGN PATENT DOCUMENTS 2061625 3/1980 Fed. Rep. of Germany .
8112477 10/1981 Fed. Rep. of Germany .

Primary Examiner—Lenard A. Footland
Attorney, Agent, or Firm—Jerome R. Drouillard; Roger L. May

[57] ABSTRACT

An intermediate bearing for the propeller shaft of a motor vehicle includes a rigid casing constituted by two parts which form an annular casing having a generally U-shaped cross section, and a tensioned, resilient deformation member contained in the casing and having on its inner periphery a receiving means for a bearing for the propeller shaft and further including radially outwardly extending tension webs which lie in the radial median plane of the bearing.

9 Claims, 3 Drawing Figures

INTERMEDIATE BEARING FOR THE PROPELLER SHAFT OF A MOTOR VEHICLE

BACKGROUND OF THE INVENTION

1. Field of the Invention

This invention relates to an intermediate bearing for the propellar shaft of a motor vehicle.

2. Disclosure Information

Intermediate bearings have been used with the propeller shafts of motor vehicles for many years. One example of such a bearing is shown in German Auslegeschrift (Published Specification) No. 20 61 625, in which there is interposed between two rigid casing parts a resilient deformation member of rubber or an equivalent material which is connected to said casing on its outer periphery by means of webs which contact one or both casing parts and which comprises on its inner periphery a receiving means for a bearing for a propeller shaft. This construction also includes stop or damper members which are integral with the resilient material of the deformation member and any necessary alteration of their elasticity is done by using inlays.

This known intermediate bearing has a disadvantage in that the resilient deformation member is joined by vulcanization to the rigid casing parts, which is relatively complicated and expensive. In addition, this known intermediate bearing has the disadvantage that the recesses between the web members and the stop and damper members are open, as a result of which dirt can settle in these recesses during the normal operation of the motor vehicle. Further, there are no provisions for damping pivoting movements of the propeller shaft.

Another construction for an intermediate bearing is shown in German Gebrauchsmuster (Utility Model) No. 81 12 477, which on its inner periphery comprises a receiving means for a bearing for a propeller shaft, with the receiving means being constructed in the form of a universal ball joint in order to permit angular deviations of the driveshaft. This known intermediate bearing too has the disadvantage that the resilient deformation members are joined by vulcanization to the rigid casing parts, which will not permit the intermediate bearing to damp angular movements of the propeller shaft.

Those skilled in the art have designed a plethora of elastomeric mountings for positioning a center bearing within its mounting bracket. Examples of such designs are shown in the following U.S. Pat. Nos.: 2,893,790; 2,906,572; 2,927,825; 2,963,106; 3,306,679; 3,309,154; 3,325,230; 3,704,922; 3,743,365; and 3,961,829. Each of these designs, as well as those disclosed in the two additional references cited above, suffers from a common functional inadequacy. This inadequacy stems directly from the fact that each of these designs is intended to function by loading the elastomeric elements in compression rather than in a tension mode. This is significant because elastomeric elements do not function as well to absorb vibration when they are subjected to compressive loading as opposed to tensile loading. The present invention, however, overcomes the difficulty of compressive loading by prestressing the web elements of its resilient deformation member in tension in order that compressive loading will not normally occur during operation of the device. Moreover, this tensile positioning of the webs of the resilient deformation member of the present invention allows the resilient deformation member to be economically positioned by means of apertures formed in the outer casing of the intermediate bearing.

SUMMARY OF THE DISCLOSURE

An intermediate bearing for the propeller shaft of a motor vehicle comprises a rigid casing constituted by two parts which form an annular casing having a generally U-shaped cross section, and a resilient deformation member contained in the casing and having on its inner periphery a receiving means for a bearing for the propeller shaft, and further comprising radially outwardly extending webs which lies in the radial median plane of the bearing and engage with apertures formed within the rigid casing. The radially outwardly extending webs are preferably prestressed in tension. One or more insert members comprising damper or stop members are preferably positioned in one or more cavities extending between the rigid casing and the resilient deformable member. The parts of the rigid casing are preferably joined together at the axial midsection of the bearing by catch means so as to form the generally U-shaped cross section.

It is an object of the present invention to provide an intermediate bearing for the propeller shaft of a motor vehicle having superior function because the resilient deformation member employed for the purpose of mounting the center bearing to the outer housing of the intermediate bearing assembly is prestressed in tension rather than in compression.

It is a further object of the present invention to provide an intermediate bearing for the propeller shaft of a motor vehicle which is easily assembled without the need for vulcanization.

It is a further object of the present invention to provide an intermediate bearing for the propeller shaft of a motor vehicle which restricts the entry of contaminants thereinto.

It is yet another object of the present invention to provide an intermediate bearing for the propeller shaft of a motor vehicle which may be tuned through the substitution of different stop and damper elements within cavities extending between the resilient deformation member and the rigid casing of the bearing.

DESCRIPTION OF THE PREFERRED EMBODIMENT

An intermediate bearing, 1, for a propeller shaft of a motor vehicle comprises two rigid casing parts 2 and 3, which can be produced by known processes from ferrous or nonferrous metals or plastic materials either in the form of pressed sheet metal parts or in the form of molded parts.

Figure 1:
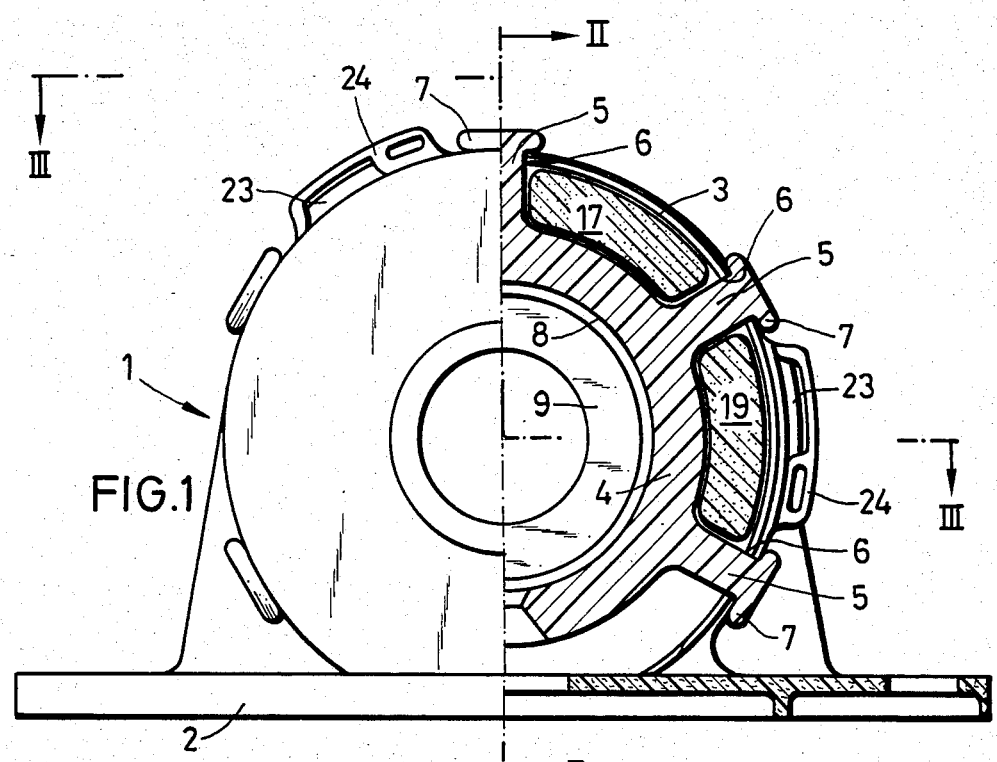
FIG. 1 is an elevation of an intermediate bearing in the axial direction of the propeller shaft, with half of the figure being in section.
Figure 2:
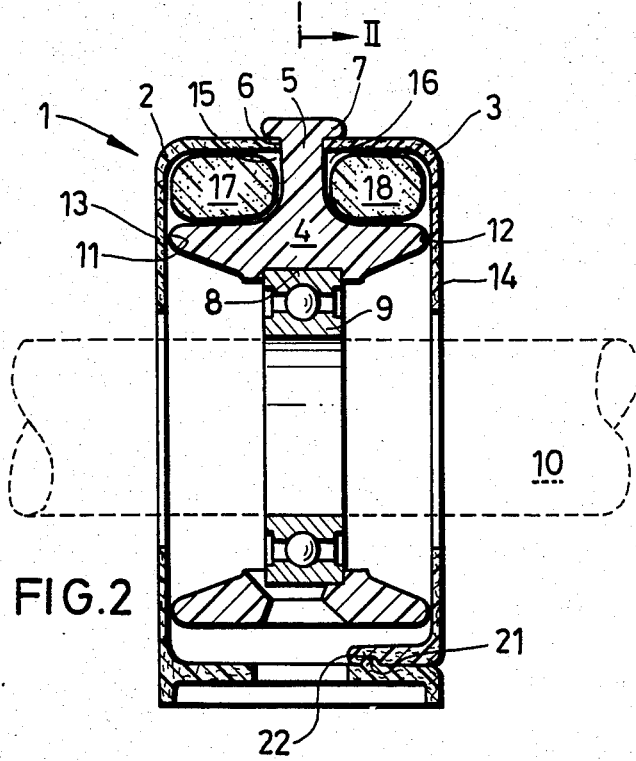
FIG. 2 is a vertical section along the line II—II in FIG. 1.
Figure 3:
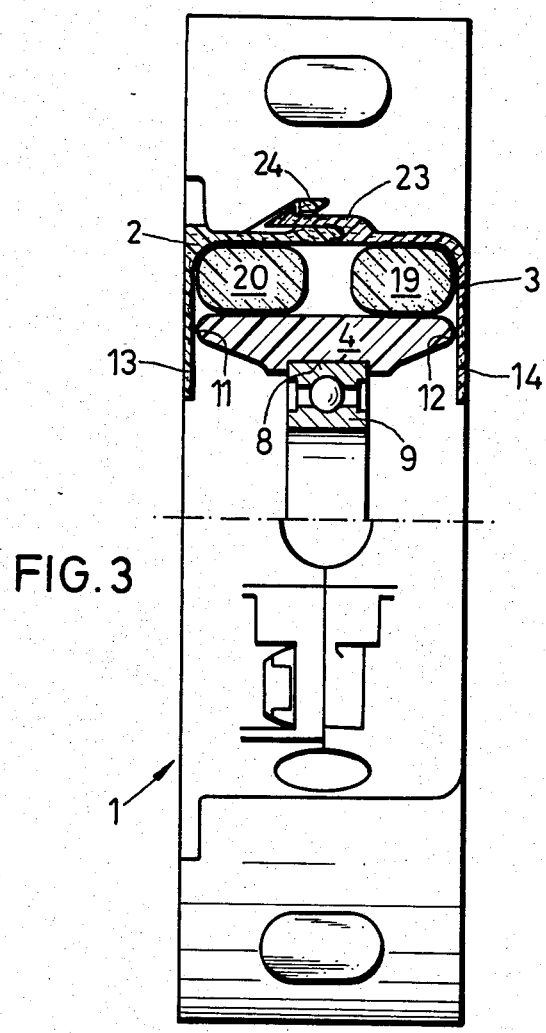
FIG. 3 is a horizontal half section along the line III—III in FIG. 1.

The two casing parts 2 and 3 are divided vertically, i.e., in a plane generally at right angles to the bearing axis and located at the axial midsection of the bearing. This vertical division is shown in the section side of FIG. 1. As shown in FIG. 1, lower fastening strap 2 is formed integrally with the casing.

Resilient deformation member 4, of rubber or an equivalent material, is interposed between the two casing parts 2 and 3. The resilient deformation member is provided on its outer periphery with a plurality of radially outwardly extending webs 5 which pass through apertures 6 in the mutually joined casing parts 2 and 3. The ends of the webs have enlarged heads, 7, which locate radially outboard of the casing and lock the webs in place. The inner periphery of the resilient deformation member 4 comprises a receiving means, 8, for a bearing, 9, for the propeller shaft, 10, which is indicated by broken lines.

Radial web members 5 are arranged on the resilient deformation member 4 in a radial median plane of the intermediate bearing 1, and resilient member 4 is provided with annular shoulders 11 and 12 which project axially in both directions and which, together with lateral sides 13 and 14 of the joined casing parts 2 and 3 forming an inwardly directed U-shaped cross section, form lateral cavities 15 and 16, within which independent stop and damping members 17, 18, 19 and 20, etc, consisting of different materials, are disposed.

The different radial and axial positions of the plurality of stop and damping members 17, 18, 19, and 20, etc., make it possible to select the stop and damping members suitably adapted to correspond to the respective vibration problems affecting the intermediate bearing. In this manner it is possible, when using a basic design of the intermediate bearing in the form of a module, to produce bearings having different characteristics which are associated with different powertrains of different motor vehicle models and which are adapted for their particular vibration behaviors.

The previously noted stop and damping members preferably comprise molded bodies formed of relatively more or less compliant materials. For example, a stop member could be formed of a solid block of polytetrafluoroethylene, and such a block would function to restrain the movement of resilient deformation member 4 and bearing 9 by preventing the bearing from moving radially into the sector occupied by the block of polytetrafluoroethylene. Accordingly, this type of block could properly be termed a "stop" member. On the other hand, in view of this disclosure, those skilled in the art will recognize that other blocks could be constructed of natural and artificial rubber compounds, which would tend to damp the movement of resilient deformation member 4 and bearing 9. Those skilled in the art will further appreciate in view of this disclosure that the stop and damping members could be constructed of a variety of metals, plastics, rubber, and compositions thereof.

Casing parts 2 and 3, particularly when in the form of fiber-reinforced plastic material, are preferably joined by a catch in the form of an annular bead 21 which cooperates with the corresponding annular groove 22 in the region of the fastening strap and in the form of catching tongues 23 which cooperate with corresponding catching openings 24 in the region of the curved periphery.

The bearing described can be produced and assembled relatively cheaply. It can effectively damp angular motion of the shaft because the action of web 5 as well as damping members 17, 18, 19, 20, etc., will tend to resist rotational vibration of the shaft. Moreover, the bearing of the present invention will be substantially unaffected by contamination because it is of closed construction. More importantly, the present bearing will very effectively damp radially directed vibrations because webs 5 are prestressed in tension. The pre-tensioning enables resilient deformable member 4 to more effectively damp radially directed vibration.

Variations and modifications of the present invention are possible without departing from its spirit and scope as defined by the appended claims.

I claim:

1. An intermediate bearing for the propeller shaft of a motor vehicle comprising:
    a rigid casing constituted by two parts which form an annular casing having a generally U-shaped cross section;
    a resilient deformation member contained in said casing and having on its inner periphery a receiving means for a bearing for said propeller shaft and further comprising radially outwardly extending webs which lie in the radial median plane of the bearing and are engaged with apertures formed in said rigid casing.

2. The intermediate bearing according to claim 1 wherein said radially outwardly extending webs are prestressed in tension.

3. The intermediate bearing according to claim 1 further comprising one or more damper members positioned in one or more cavities extending between said rigid casing and said resilient deformable member.

4. The intermediate bearing according to claim 1 further comprising one or more stop members positioned in one or more cavities extending between said rigid casing and said resilient deformable member.

5. The intermediate bearing according to claim 1 wherein said parts of said rigid casing are joined at the axial midpoint of said bearing by catch means.

6. An intermedite bearing for the propeller shaft of a motor vehicle comprising:
    a rigid casing comprising two generally annular halves joined together at the axial midsection of said bearing by catch means so as to form a generally U-shaped cross section; and
    a resilient deformation member contained in said casing and having on its inner periphery a receiving means for a bearing for said propeller shaft and further comprising radially outwardly extending webs which are prestressed in tension and attached to said casing and further comprising annular segments projecting in both axial directions from said receiving means; and
    one or more insert members positioned within one or more cavities formed by the interior surface of said rigid casing and by the webs and annular, axially extending segments of said resilient deformation member.

7. The intermediate bearing according to claim 6 wherein said insert members comprises one or more damping elements.

8. The intermediate bearing according to claim 6 wherein said insert members comprises one or more stop elements.

9. The intermediate bearing according to claim 6 wherein said insert members comprises one or more damping elements and one or more stop elements.

* * * * *